(12) United States Patent
Seo

(10) Patent No.: US 6,629,159 B1
(45) Date of Patent: Sep. 30, 2003

(54) METHOD FOR MODIFYING DATA OF SPECIFIC REGISTER IN DIGITAL INTERFACE

(75) Inventor: Sang Il Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 446 days.

(21) Appl. No.: 09/628,547

(22) Filed: Jul. 28, 2000

(30) Foreign Application Priority Data

Jul. 31, 1999 (KR) .......................................... 1999-31593
Jul. 31, 1999 (KR) .......................................... 1999-31594

(51) Int. Cl.[7] ................................................ G06F 3/00
(52) U.S. Cl. ......................... 710/15; 710/36; 710/107; 710/313; 710/314
(58) Field of Search ........................... 710/15, 36, 107, 710/313, 314

(56) References Cited

U.S. PATENT DOCUMENTS 5,828,656 A  * 10/1998 Sato et al. .................. 370/254
6,266,346 B1 *  7/2001 Takeda et al. ............... 370/468
6,366,968 B1 *  4/2002 Hunsaker ..................... 710/52
6,389,496 B1 *  5/2002 Matsuda ..................... 710/316
6,408,355 B1 *  6/2002 Toguchi ...................... 710/314
6,421,745 B1 *  7/2002 James et al. .................. 710/34
6,445,711 B1 *  9/2002 Scheel et al. ................ 370/402

* cited by examiner

*Primary Examiner*—Jeffrey Gaffin
*Assistant Examiner*—Niketa Patel
(74) *Attorney, Agent, or Firm*—Birch, Stewart, Kolasch & Birch, LLP

(57) ABSTRACT

A method for updating data of a plug control register in a digital interface having a plurality of audio/video nodes. The method includes the steps of retrieving a signal that determines whether a first audio/video node is entitled to update a value of the plug control register of a second audio/video node, when the first audio/video node requests that the second audio/video node update a value of the plug control register through a read/lock transaction; transmitting the determining signal to the first audio/video node through a lock response packet; and updating the value of the plug control register of the second audio/video node with a data value transmitted from the first audio/video node, when the first audio/video node is entitled to update the value of the plug control register of the second audio/video node and when an argument value transmitted from the first audio/video node is equal to the value of the plug control register of the second audio/video node.

7 Claims, 10 Drawing Sheets

FIG.5A

| Code | Name | Comment |
|---|---|---|
| 0 | resp_complete | The node has successfully completed the command. |
| 1 | Reserved | |
| 2 | Reserved | |
| 3 | Reserved | |
| 4 | resp_conflict_error | A resource conflict was detected. The request may be retired. |
| 5 | resp_data_error | Hardware error, data is unavailable. |
| 6 | resp_type_error | A field in the request packet header was set to an unsupported or incorrect value. |
| 7 | resp_address_error | The destination offset field in the request was set to an address not accessible in the destination node. |
| 8 | resp_access_error | Request node doesn't have the right to modify the request address. |
| 9 to F$_{16}$ | Reserved | |

FIG.5B

| destination_ID | tLabel | rt | tcode | ri |
|---|---|---|---|---|
| source_ID | rcode (1000) | Reserved | | |
| Reserved | | | | |
| data_length | extended_tcode | | | |
| header_CRC | | | | |
| old_value | | | | |
| data_CRC | | | | |

METHOD FOR MODIFYING DATA OF SPECIFIC REGISTER IN DIGITAL INTERFACE

BACKGROUND OF THE INVENTION

1. Field of the Invention

The present invention relates to a digital interface, and more particularly, to a method for modifying data of a plug control register in a digital interface.

2. Discussion of the Related Art

FIGS. 1 and 2 show a conventional method for modifying data of a plug control register in a digital interface.

FIG. 1 shows connection state between audio/video nodes in a 1394 serial bus system according to the related art method.

A first audio/video node 20 includes first and second input plug control registers 21 and 22, and a first input master plug register 23. The registers 21, 22 and 23 input and output connection information between audio/video nodes connected to a 1394 serial bus 10 in accordance with a control signal of an application node(not shown). A second audio/video node 30 includes a third input plug control register 31 and a second input master plug register 32. The registers 31 and 32 input and output connection information between apparatuses connected to the 1394 serial bus 10 in accordance with the control signal of the application node. A third audio/video node 40 includes a fourth input plug control register 41 and a third input master plug register 42. The registers 41 and 42 input and output connection information connected between the apparatuses connected to the 1394 serial bus 10 in accordance with the control signal of the application node. A fourth audio/video node 50 includes fifth and sixth plug control registers 51 and 52 and a fourth input master plug register 53. The registers 51, 52 and 53 input and output connection information between the apparatuses connected to the 1394 serial bus 10 in accordance with the control signal of the application node. A fifth audio/video node 60 includes a plug control register 61 and an output master plug register 62. The registers 61 and 62 input and output connection information between the apparatuses connected to the 1394 serial bus in accordance with the control signal of the application node.

A related art method for modifying data of a plug control register of audio/video nodes will be described with reference to FIG. 2.

A channel of transmitting isochronous data from the fifth audio/video node 60 to the first audio/video node 20 by point-to-point connection or broadcast connection is assigned to an application node. The application node writes data of a plug control register and an input plug register within the fifth audio/video node 60 in the plug control register 61 and the second input plug register 22 at the same format.

Afterwards, the application node writes "1" in on-line bit of the plug control register 61 and on-line bit of the second input plug register 22 in the fifth audio/video node 60 to transmit the isochronous data.

Also, the application node records "1" in a broadcast connection counter or a point-to-point connection counter of the plug control register 61 within the fifth audio/video node 60.

Thus, the isochronous data is transmitted from the fifth audio/video node 60 to the first audio/video node 20 through the channel.

As described above, the isochronous data is transmitted from the fifth audio/video node 60 to the second and fourth audio/video nodes 30 and 40.

In this situation, the sixth audio/video node transmits a read request signal to the fifth audio/video node 60 to modify data of the plug control register 61 of the fifth audio/video node 60. Then, the fifth audio/video node 60 inputs a read response signal to the sixth audio/video node and transmits a value of its plug control register 61 to the sixth audio/video node.

The sixth audio/video node records the value of the plug control register 61 of the fifth audio/video node 60 transmitted through the read response signal in a memory as read data. The read data is an argument value.

The sixth audio/video node modifies the argument value and records the modified value in the memory as a data value.

Subsequently, the sixth audio/video node inputs a lock request signal to the fifth audio/video node and transmits the modified data value and the argument value prior to modification.

The fifth audio/video node 60 compares the transmitted argument value with a value of its plug control register 61. As a result, if the transmitted argument value is equal to the value of the plug control register 61, the fifth audio/video node 60 modifies the value of the plug control register 61 to the data value.

However, the related art method for modifying data of a plug control register in a digital interface has several problems.

In case where the sixth audio/video node is not entitled to modify the value of the plug control register of the fifth audio/video node 60 after the sixth audio/video node has received a lock transaction, the fifth audio/video node 60 cannot inform the sixth audio/video node which requested the lock transaction that the sixth audio/video node is not entitled to modify the value of the plug control register. Therefore, if the sixth audio/video node receives the lock transaction, the sixth audio/video node determines that the value of the plug control register of the fifth audio/video node has been modified whether lock transaction is entitled to modify the plug control register or not.

SUMMARY OF THE INVENTION

Accordingly, the present invention is directed to a method for modifying data of a plug control register in a digital interface that substantially obviates one or more of the problems due to limitations and disadvantages of the related art.

An object of the present invention is to provide a method for modifying data of a plug control register in a digital interface in which it is recognized whether or not a value of a plug control register can be modified using a read/lock transaction between audio/video nodes connected to the digital interface.

To achieve these and other advantages and in accordance with the purpose of the present invention, as embodied and broadly described, a method is provided for updating data of a plug control register in a digital interface having a plurality of audio/video nodes, the method comprising:

if a first audio/video node requests a second audio/video node to update a value of the plug control register through a read/lock transaction, retrieving a signal that determines whether the first audio/video node is entitled to update a value of the plug control register of the second audio/video node;

transmitting the determining signal to the first audio/video node through a lock response packet; and if the first audio/video node is entitled to update the value of the plug control register of the second audio/video node and if an argument value transmitted from the first audio/video node is equal to the value of the plug control register of the second audio/video node, then updating the value of the plug control register of the second audio/video node with a data value transmitted from the first audio/video node.

According to the above-mentioned features, the present invention has the advantage that, by using a signal that determines whether or not the first audio/video node is entitled to update the value of the plug control register of the second audio/video node when the first audio/video node requests the second audio/video node to update the value of the plug control register through the read/lock transaction, it is possible to update the data of the plug control register only by the audio/video node entitled to update it.

In another aspect, the method for modifying data of a plug control digital interface includes the determining signal being at least one of a signal "resp_complete" indicating that the first audio/video node is entitled to update the value of the plug control register of the second audio/video node and a signal "resp_access_error" indicating that the first audio/video node is not entitled to update the value of the plug control register of the second audio/video node.

In still another aspect, the method for modifying data of a plug control register in a digital interface according to the present invention is characterized in that the signals "resp_complete" and "resp_access error" are recorded in "rcode" of the lock response packet.

In another further aspect, the method for modifying data of a plug control register in a digital interface according to the present invention further includes the steps of comparing an argument value transmitted from the first audio/video node with a value of the plug control register; if the argument value is equal to the value of the plug control register, modifying a data value transmitted from the first audio/video node to the value of the plug control register using the signal as to whether to be modified as the signal "resp_complete"; and if the argument value is equal to the value of the plug control register, maintaining the value of the specific register using the signal as to whether to be modified as the signal "resp_access error".

In another aspect, a method is provided for updating data of a plug control register in a digital interface having a plurality of audio/video nodes, the method comprising:

if a value of the plug control register of a first audio/video node is transmitted to a second audio/video node before and after the value of the plug control register of the second audio/video node is updated, retrieving a signal that determines whether the first audio/video node is entitled to update the value of the plug control register of the second audio/video node;

if the first audio/video node is entitled to update the value of the plug control register of the second audio/video node and if the value of the plug control register of the second audio/video node is equal to the value of the plug control register transmitted from the first audio/ video node before the value of the plug control register of the second audio/video node is updated, then updating the value of the plug control register of the second audio/video node with the value of the plug control register transmitted from the first audio/video node after the value of the plug control register of the second audio/video node is updated; and requesting the second audio/video node to send the updated value of the plug control register, and holding the update request from another audio/video node through a lock transaction until the first audio/video node receives the updated value from the second audio/video node.

In a still further aspect, the present invention is characterized in that lock transaction is performed at another audio/video node if the first audio/video node does not request the updated value in a predetermined time.

By holding the update request from another audio/video node through the lock transaction until the first audio/video node receives the updated value from the second audio/node, the first audio/video node can update the data of the plug control register of the second audio/video node without interruption of another audio/video node.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIGS. 5a and 5b show a value resp_access_error and a lock response packet used for a method for modifying data of a specific register according to the first embodiment of the present invention;

DETAILED DESCRIPTION OF THE PREFERRED EMBODIMENTS

Reference will now be made in detail to the preferred embodiments of the present invention, in which a method for modifying data of a plug control register in a digital interface according to the present invention is described with reference to the accompanying drawings.

Figure 1:
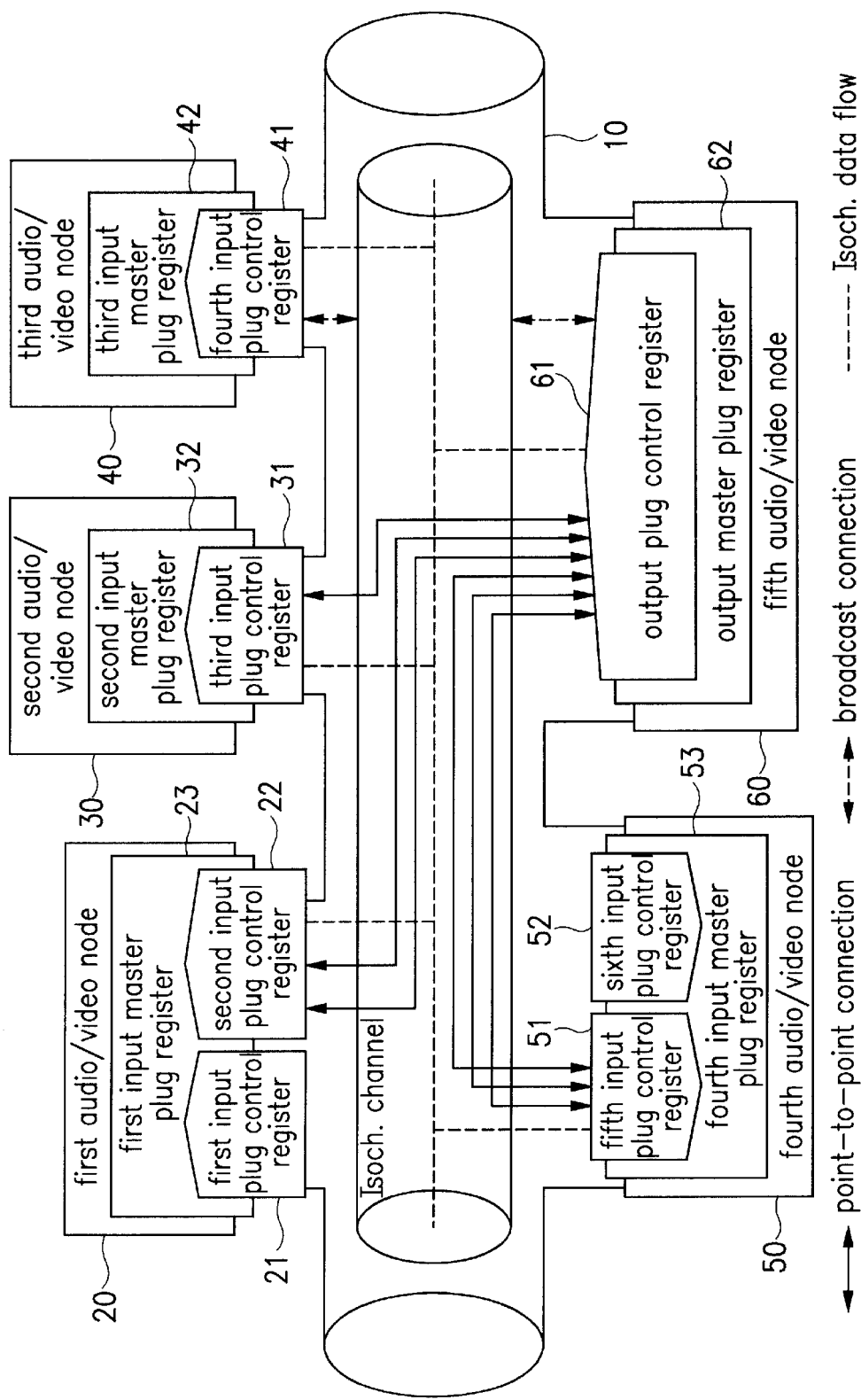
FIG. 1 shows connection state between audio/video nodes of 1394 system in a related art.
Figure 2:
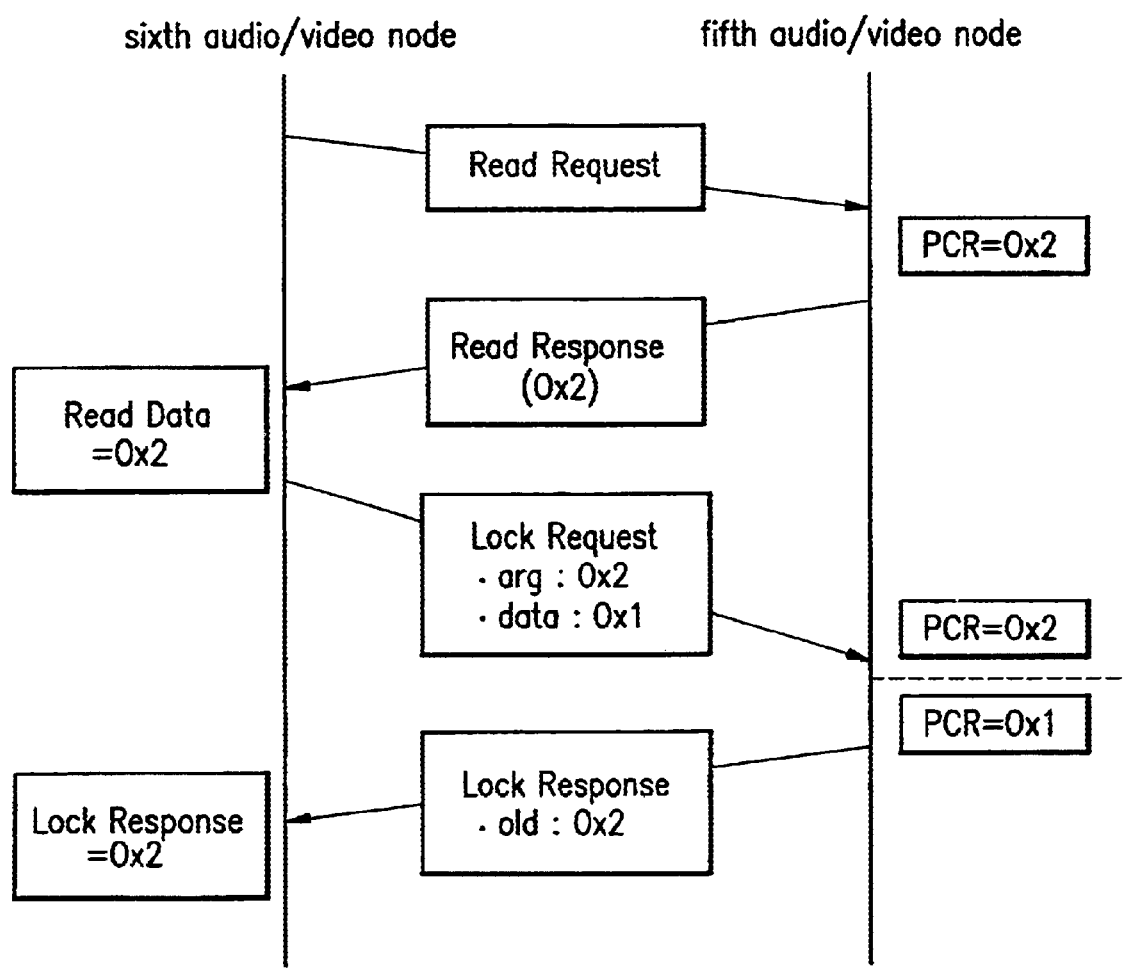
FIG. 2 shows a related art method for modifying data of a specific register in audio/video nodes.

Elements of the present invention are equal to those of FIG. 1 and thus their description will be omitted.

Figure 3:
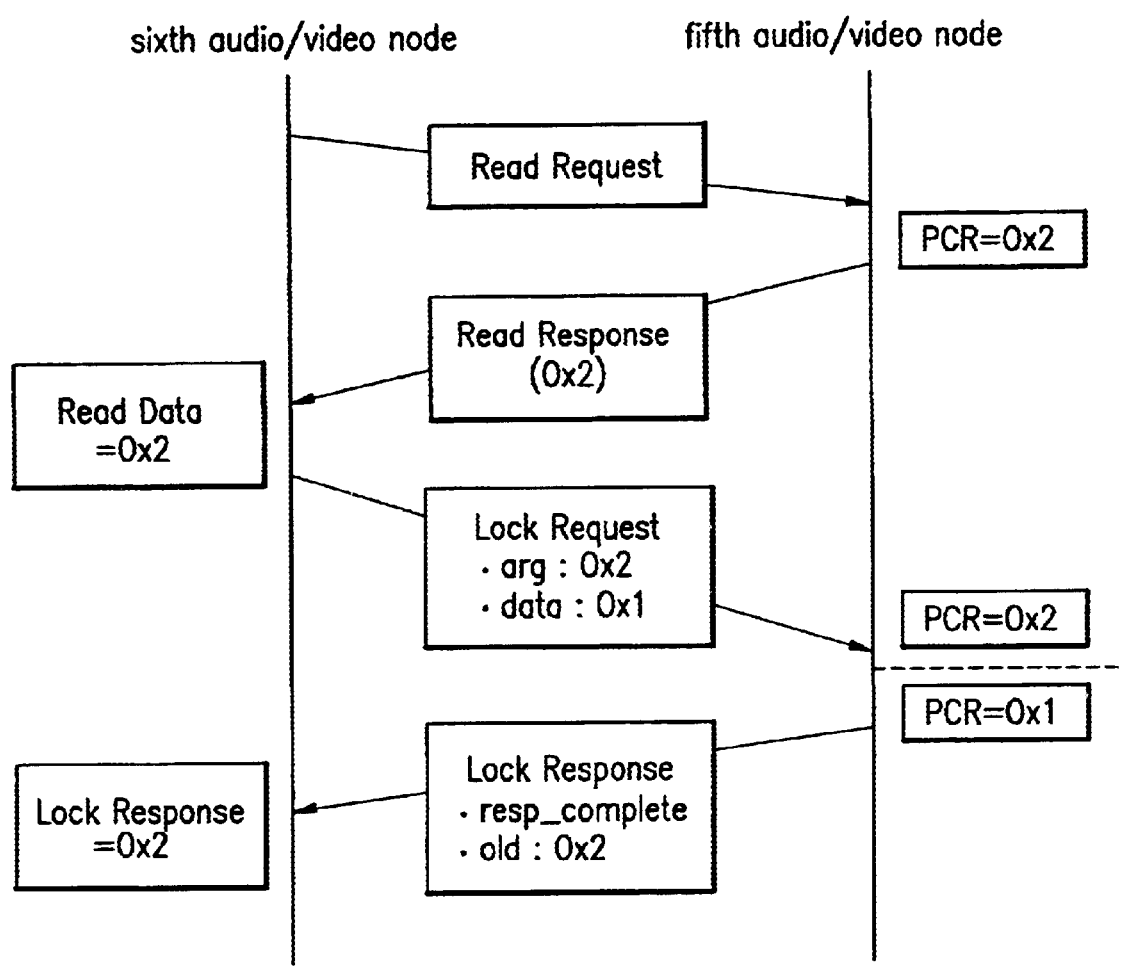
FIG. 3 shows a method for modifying data of a specific register in a node having modification right according to the first embodiment of the present invention.

As shown in FIG. 3, a sixth audio/video node transmits a read request signal to a fifth audio/video node 60 to modify data of a plug control register 61 in the fifth audio/video node 60. The fifth audio/video node 60 transmits a value of the plug control register 61 to the sixth audio/video node through a read response in accordance with the read request signal.

The sixth audio/video node stores the value of the plug control register 61 of the fifth audio/video node 60 transmitted through the read response in a memory as read data. The sixth audio/video node records the read data value stored in the memory as an argument value, and records its modified value as a data value.

Subsequently, the sixth audio/video node transmits the argument value and the data value to the fifth audio/video node 60 through the lock request signal.

A method for recognizing modification right between audio/video nodes will be described with reference to two embodiments.

First Embodiment

If the argument value and the data value are transmitted from the sixth audio/video node to the fifth audio/video node 60 through the lock request signal, the fifth audio/video node 60 retrieves whether the sixth audio/video node has a modification right to update a value of the plug control register. As a result, if it is determined that the sixth audio/video node has such a modification right, the fifth audio/video node 60 transmits a signal "resp_complete" which can modify a value of the plug control register 61 of the fifth audio/video node 60 to the sixth audio/video node through the lock response.

The fifth audio/video node 60 compares the argument value with the value of the plug control register 61. As a result, if the argument value is equal to the value of the plug control register 61, the fifth audio/video node 60 modifies the value of the plug control register 61 to the data value.

Subsequently, the sixth audio/video node recognizes that the value of the plug control register has been successfully modified in accordance with the signal "resp_complete" transmitted from the fifth audio/video node 60 through the lock response.

Figure 4:
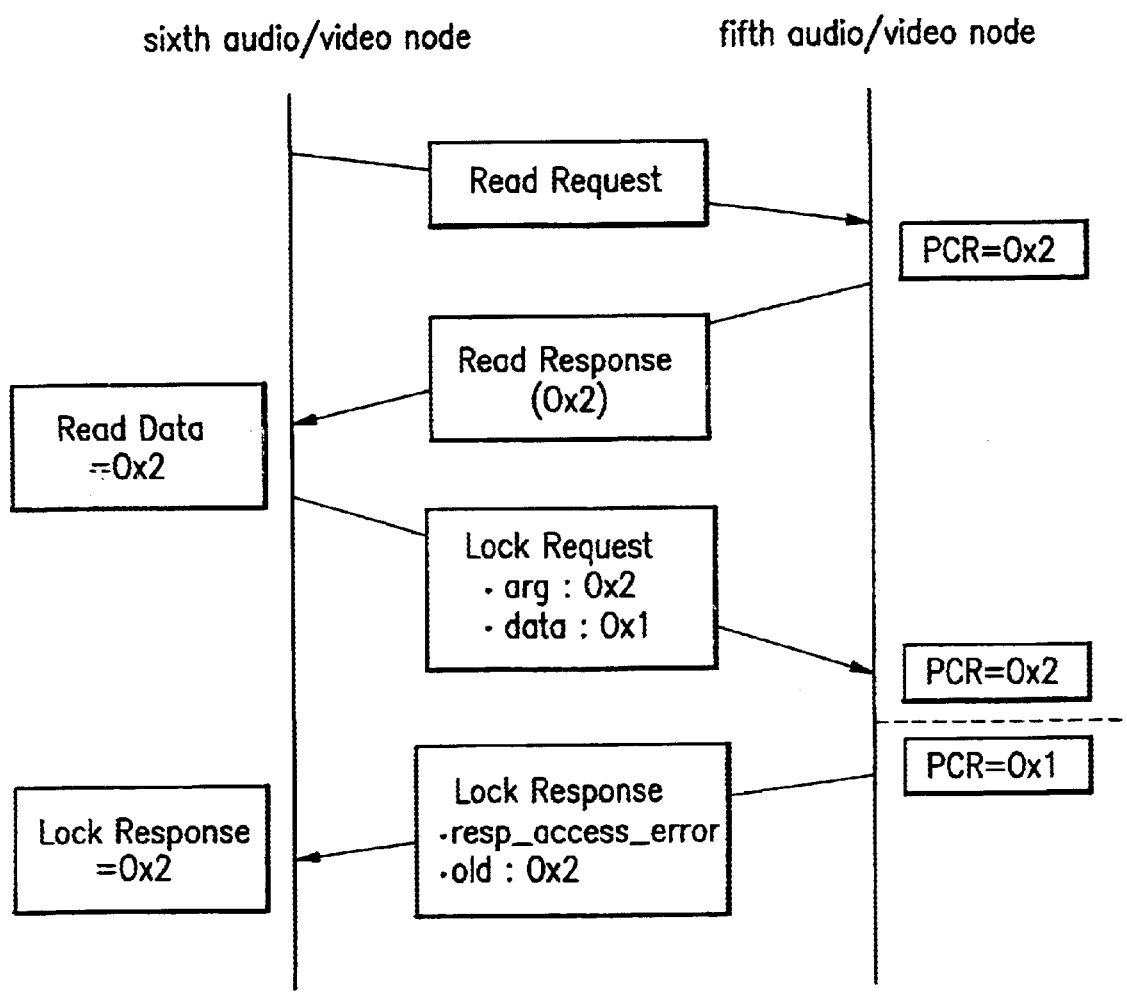
FIG. 4 shows a method for modifying data of a specific register in a node having no modification right according to the first embodiment of the present invention.
Figure 6:
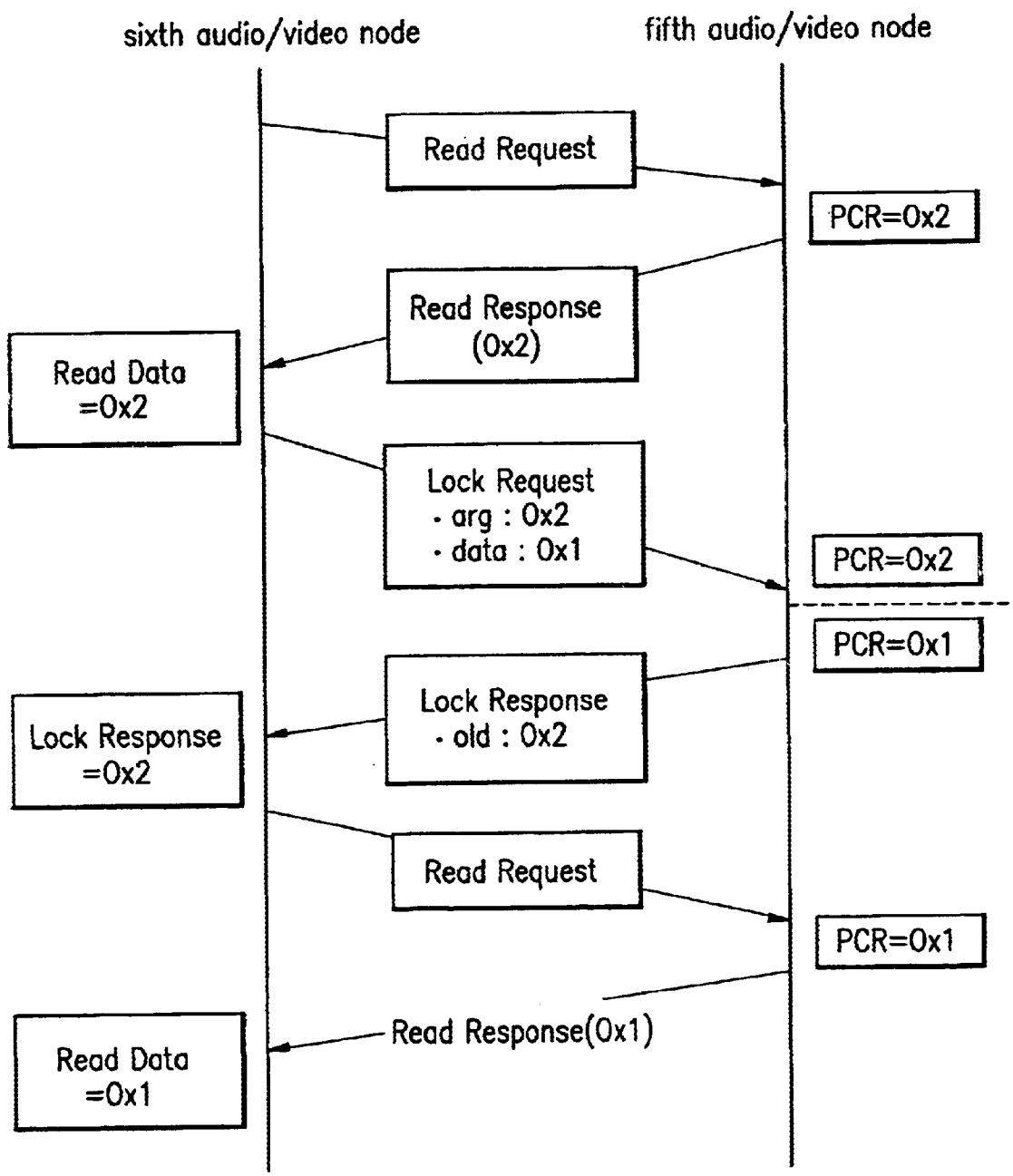
FIG. 6 shows a method for modifying data of a specific register in audio/video nodes having modification right according to the second embodiment of the present invention.

Meanwhile, if it is determined that the sixth audio/video node has no modification right, as shown in FIG. 4, the fifth audio/video node transmits a signal "resp_access_error" which cannot modify the value of the plug control register 61 to the sixth audio/video node through the lock response.

The signal "resp_access_error" and the lock response packet are shown in FIGS. 5a and 5b.

The fifth audio/video node 60 does not modify the value of the plug control register 61 because the sixth audio/video node does not have any modification right which can modify the value of the plug control register.

Furthermore, the sixth audio/video node recognizes that the value of the plug control register 61 of the fifth audio/video node 60 cannot be modified, in accordance with the lock response of the fifth audio/video node 60.

That is to say, data of the plug control register is prevented from being modified by the audio/video node having no modification right.

Second Embodiment

If the argument value and the data value are transmitted from the sixth audio/video node to the fifth audio/video node 60 through the lock request signal, the fifth audio/video node 60 retrieves whether the sixth audio/video node has modification right. As a result, if it is determined that the sixth audio/video node has modification right, the fifth audio/video node 60 transmits the lock response to the sixth audio/video node.

The fifth audio/video node 60 compares the argument value with a value of its plug control register 61. As a result, if the argument value is equal to the value of the plug control register 61, the fifth audio/video node 60 modifies the value of the plug control register 61 to the data value.

After lock response from the fifth audio/video node 60, to recognize whether the value of the plug control register of the fifth audio/video node 60 has been modified, the sixth audio/video node requests the fifth audio/video node 60 the modified value of the plug control register of the fifth audio/video node through read request.

Then, the fifth audio/video node 60 transmits the modified value of the plug control register to the sixth audio/video node through read response.

Subsequently, the sixth audio/video node compares a value transmitted from the fifth audio/video node 60 with its modified value. As a result, if the value transmitted from the fifth audio/video node 60 is equal to the modified value, the sixth audio/video node recognizes that the value of the plug control register 61 of the fifth audio/video node 60 has been successfully modified.

Figure 7:
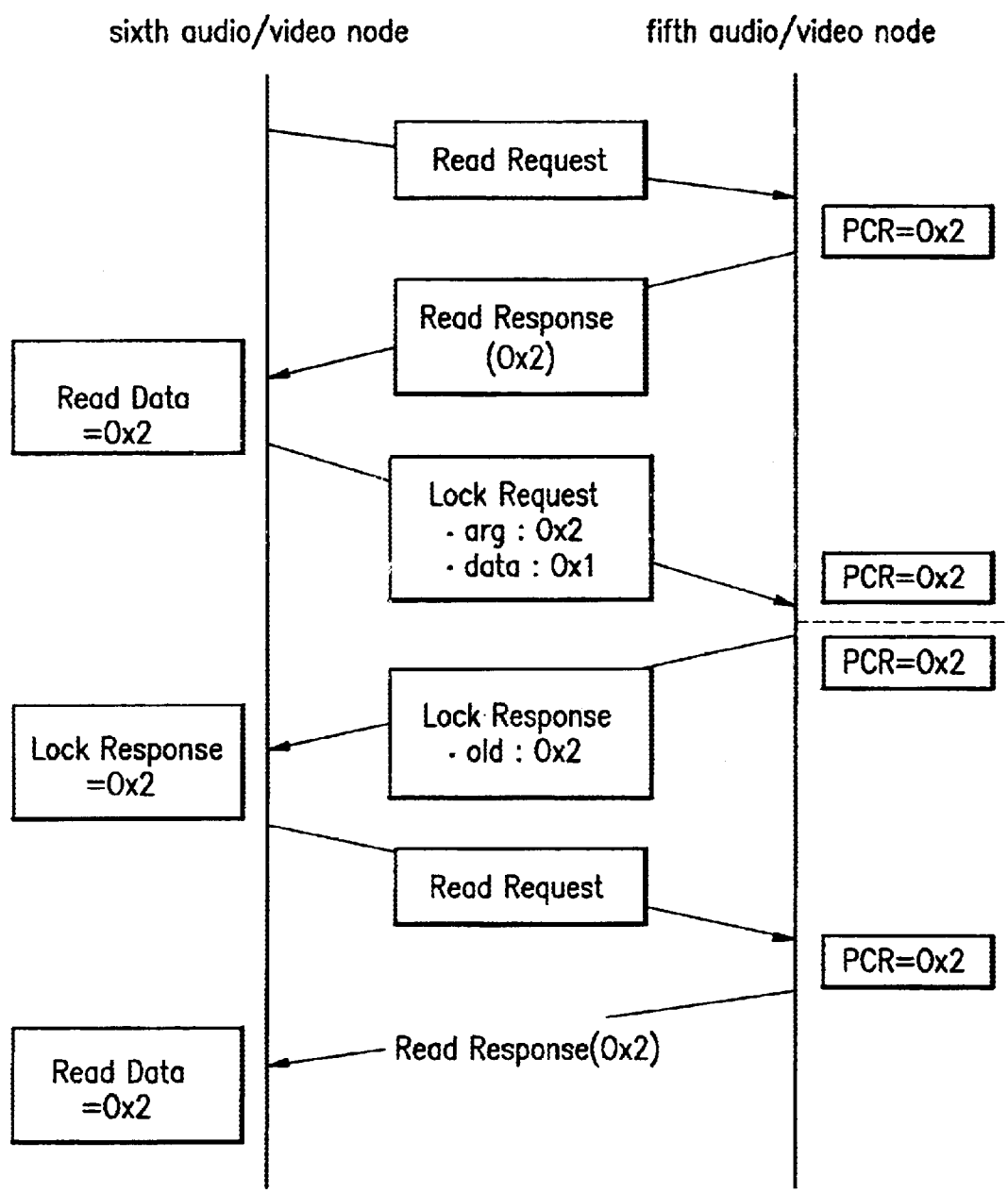
FIG. 7 shows a method for modifying data of a specific register in audio/video nodes having no modification right according to the second embodiment of the present invention.

Meanwhile, if it is determined that the sixth audio/video node has no modification right of a value of the plug control register, as shown in FIG. 7, the fifth audio/video node maintains the value of the plug control register 61 as it is without modifying it to the argument value transmitted from the sixth audio/video node.

The fifth audio/video node 60 transmits a lock response signal to the sixth audio/video node. Then, the sixth audio/video node requests the fifth audio/video node 60 of read request to recognize whether or not the value of the plug control register has been modified.

Thus, the fifth audio/video node 60 transmits a value of the plug control register, which is not modified, through the read response in accordance with read request of the sixth audio/video node.

Subsequently, the sixth audio/video node compares the value transmitted from the fifth audio/video node with read data of a previous read request. As a result, if the value transmitted from the fifth audio/video node is equal to the read data, the sixth audio/video node recognizes that the value of the plug control register of the fifth audio/video node has not been modified.

That is to say, data of the plug control register is prevented from being modified by the audio/video node having no modification right.

However, as an example, it is assumed that after the lock response is transmitted from the fifth audio/video node to the sixth audio/video node, a seventh audio/video node having modification right modifies the value of the plug control register of the fifth audio/video node in accordance with the lock request before the sixth audio/video node requests read request.

If the sixth audio/video node requests read request, the fifth audio/video node transmits the modified value of the plug control register by the seventh audio/video node to the sixth audio/video node.

In this case, the sixth audio/video node compares the value of the plug control register with its modified value. If the value of the plug control register is equal to the modified value, the sixth audio/video node may misunderstand that the value of the plug control register was successfully modified.

Figure 8:
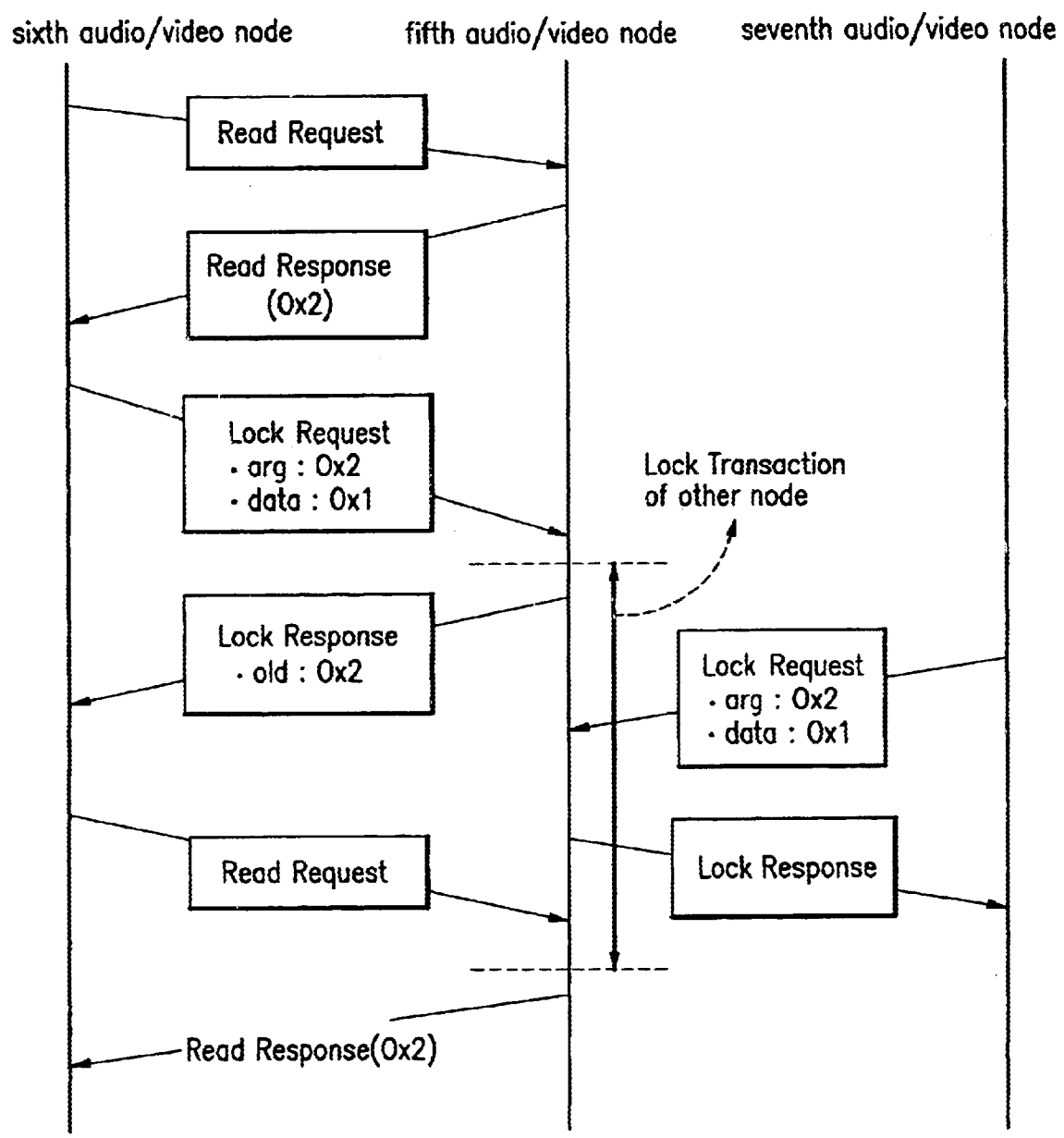
FIG. 8 shows data modification request procedures between lock request and read request in audio/video nodes having no modification right according to the second embodiment of the present invention.

Therefore, to avoid such misunderstanding, as shown in FIG. 8, the fifth audio/video node sends a lock transaction of another node back to the sixth audio/video node until the sixth audio/video node which has received lock response requests a read request.

Figure 9:
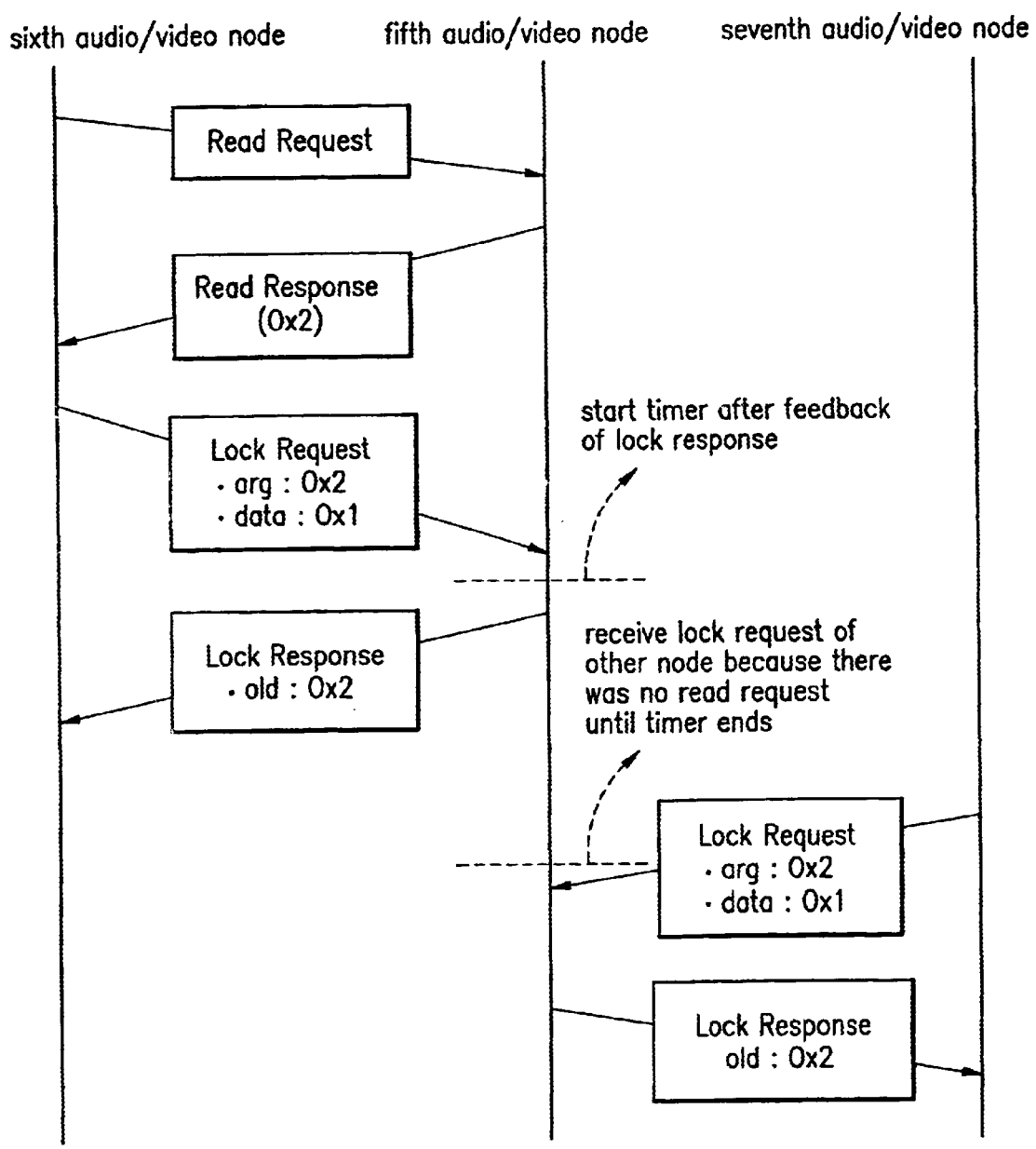
FIG. 9 shows procedures in case where there is no read request in audio/video nodes having no modification right according to the second embodiment of the present invention.

Furthermore, as shown in FIG. 9, after the fifth audio/video node sends the lock response back to the sixth audio/video node, the fifth audio/video node starts to operate a timer having a preset value.

Afterwards, if there is no read request from the sixth audio/video node, the fifth audio/video node repeats the above steps in accordance with lock request of the seventh audio/video node until the timer is ended.

As mentioned above, the method for modifying data of a plug control register in a digital interface according to the present invention has the following advantages.

The signal as to whether or not the value of the plug control register can be updated is transmitted between the audio/video nodes connected to the digital interface, through read/lock transaction. Thus, it is possible to prevent data of the plug control register from being updated by the audio/video nodes having no modification right.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for updating data of a plug control register in a digital interface having a plurality of audio/video nodes, the method comprising:

if a first audio/video node requests a second audio/video node to update a value of the plug control register through a read/lock transaction, retrieving a signal that determines whether the first audio/video node is entitled to update a value of the plug control register of the second audio/video node;

transmitting the determining signal to the first audio/video node through a lock response packet; and if the first audio/video node is entitled to update the value of the plug control register of the second audio/video node and if an argument value transmitted from the first audio/video node is equal to the value of the plug control register of the second audio/video node, then updating the value of the plug control register of the second audio/video node with a data value transmitted from the first audio/video node.

2. The method as claimed in claim 1, wherein the determining signal is at least one of a signal "resp_complete" indicating that the first audio/video node is entitled to update the value of the plug control register of the second audio/video node and a signal "resp_access_error" indicating that the first audio/video node is not entitled to update the value of the plug control register of the second audio/video node.

3. The method as claimed in claim 2, wherein the signals "resp_complete" and "resp_access_error" are recorded in "rcode" of the lock response packet.

4. A method for updating data of a plug control register in a digital interface having a plurality of audio/video nodes, the method comprising:

if a value of the plug control register of a first audio/video node is transmitted to a second audio/video node before and after the value of the plug control register of the second audio/video node is updated, retrieving a signal that determines whether the first audio/video node is entitled to update the value of the plug control register of the second audio/video node;

if the first audio/video node is entitled to update the value of the plug control register of the second audio/video node and if the value of the plug control register of the second audio/video node is equal to the value of the plug control register transmitted from the first audio/video node before the value of the plug control register of the second audio/video node is updated, then updating the value of the plug control register of the second audio/video node with the value of the plug control register transmitted from the first audio/video node after the value of the plug control register of the second audio/video node is updated;

requesting the second audio/video node to send the updated value of the plug control register; and holding the update request from another audio/video node through a lock transaction until the first audio/video node receives the updated value from the second audio/video node.

5. The method as claimed in claim 4, further comprising:

comparing the updated value of the plug control register of the second audio/video node with the value requested to update by the first audio/video node; and recognizing that the value of the plug control register of the second audio/video node has been successfully updated if the updated value of the plug control register of the second audio/video node is equal to the value requested to update by the first audio/vodeo node.

6. The method as claimed in claim 4, wherein the values before and after the value of the plug control register is updated are an argument value and a data value, respectively.

7. The method as claimed in claim 4, wherein the lock transaction is performed at another audio/video node if the first audio/video node does not request the updated value in a predetermined time.

* * * * *